Patented Sept. 28, 1948

2,450,118

UNITED STATES PATENT OFFICE 2,450,118

PREPARATION OF β-LACTONES

John R. Caldwell, Kingsport, Tenn., assignor to Eastman Kodak Company, Rochester, N. Y., a corporation of New Jersey No Drawing. Application July 23, 1947,
Serial No. 763,151

19 Claims. (Cl. 260—344)

This invention relates to a process for preparing beta-lactones, i. e., lactones of beta-hydroxy carboxylic acids. More specifically this invention relates to a process for preparing beta-lactones by reacting a ketene with carbonyl-containing compounds such as aldehydes, ketones, diketones, or keto-esters.

Staudinger first showed that keto-ketenes, such as diphenyl ketene, react with aldehydes and ketones to give lactones, (Annalen 384, 1911, pages 38 to 135, and Annalen 380, 1911, page 243), and with unsaturated ketones to give unsaturated hydrocarbons, (Annalen 401, 1913, page 263). It has long been known that aldo-ketenes, such as methyl ketene, readily polymerize to the dimer under ordinary conditions of temperature and pressure. Boese in U. S. Patent No. 2,108,427, dated February 15, 1939, shows that ketene dimers react with aldehydes to produce unsaturated ketones. The process of my invention, however, is applicable both to aldo- and keto-ketenes although ketene itself is usually preferred.

Kung in U. S. Patent No. 2,356,459, dated August 22, 1944, shows the reaction between ketenes and aldehydes and ketones to produce beta-lactones, a catalyst of the Friedel-Crafts type being employed. I have now found that when a ketene is reacted with an aldehyde, ketone, diketone, or keto-ester, hereinafter referred to as a carbonyl-containing compound, in the presence of a catalytic amount of zinc nitrate, beta-lactones are attained in increased yields and without the formation of the product-catalyst complexes which are produced when the Friedel-Crafts type catalysts of the prior art are used.

It is therefore an object of this invention to provide a process for preparing beta-lactones in yields of 75-85%.

It is a further object of my invention to provide a new catalyst for the reaction between a ketene and a carbonyl-containing compound whereby undesirable catalyst complexes are not formed. Other objects will become apparent from a consideration of the following examples.

According to my process, a ketene is reacted with a carbonyl-containing compound in the presence of a catalytic amount of zinc nitrate.

Aldehydes which may be utilized in my invention are represented by the formula:

where R stands for hydrogen; an alkyl radical, such as methyl, ethyl, propyl, butyl, secondary butyl and tertiary butyl radicals, i. e., an alkyl group of the formula $C_nH_{2n+1}$ where $n$ is a positive integer of 1 to 4; an aralkyl radical, such as benzyl or beta-phenyl ethyl; and an aryl group such as phenyl, ortho-, meta-, and para-tolyl, i. e., an aryl radical of the benzene series having 6 to 10 carbon atoms. Aldehydes where R is hydrogen or methyl are preferred for the purpose of my invention. However, other aldehydes may likewise be employed.

Ketones which may be employed in my process have the formula:

wherein $R_1$ and $R_2$ represent the same or different alkyl groups, such as methyl, ethyl, propyl, butyl, secondary and teritary butyl, i. e. an alkyl radical having the formula $C_nH_{2n+1}$, where $n$ is a positive integer from 1 to 4; an aryl group, such as phenyl, ortho-, meta-, and para-tolyl, i. e., an aryl group of the benzene series having 6 to 10 carbon atoms; or an aralkyl group, such as benzyl or beta-phenyl ethyl. Acetone is the preferred ketone due to its commercial availability. However, other ketones may likewise be used expeditiously.

The diketones which I prefer to use in my process have the formula:

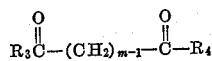

wherein $R_3$ and $R_4$ represent an alkyl radical, such as methyl, ethyl, propyl, isopropyl, butyl, secondary and tertiary butyl, i. e., an alkyl radical of the formula $C_nH_{2n+1}$ wherein $n$ is a positive integer of 1 to 4, and $m$ represents a positive integer of 1 to 3.

Suitable keto-esters which may be used have the formula:

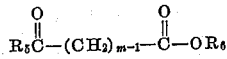

wherein $R_5$ and $R_6$ represent the same or different alkyl radicals, such as methyl, ethyl, propyl, isopropyl, butyl, secondary and tertiary butyl, and $m$ is a positive integer from 1 to 3.

Typical carbonyl compounds which may be used in practicing my invention are formaldehyde, acetaldehyde, propionaldehyde, butyraldehyde, isobutyraldehyde, benzaldehyde, phenylacetaldehyde, beta-phenyl propionaldehyde, tolyl aldehyde, acetone, diethyl ketone, methyl ethyl ketone, methyl propyl ketone, methyl butyl ketone, acetophenone, benzophenone, methyl benzyl ketone, paramethyl acetophenone, biacetyl, acetyl acetone, hexandione 2,4, methyl pyruvate, ethyl pyruvate, methyl and ethyl acetoacetates, methyl and ethyl levulinates and the like. In addition, compounds not set forth in the above formulae, such as crotonaldehyde, furfuraldehyde, methyl cyclohexyl ketone, methyl isopropenyl ketone, and other olefinic ketones or aldehydes likewise may be employed.

Ketenes which may be employed in my invention have the formula:

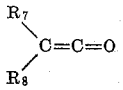

wherein $R_7$ and $R_8$ represent hydrogen, the same or different alkyl radicals, such as methyl, ethyl, propyl, isopropyl, butyl, secondary and tertiary butyl, i. e. an alkyl radical having 1 to 4 carbon atoms, an aryl radical, such as phenyl, ortho-, meta-, and para-tolyl, i. e., an aryl radical of the benzene series having 6 to 10 carbon atoms or an aralkyl radical, such as benzyl, beta-phenyl ethyl and the like. Ketenes where $R_7$ and $R_8$ are hydrogen or a methyl radical represent a preferred group.

As has been noted, the catalyst which I employ in my process is zinc nitrate. The concentration of catalyst may be varied from 0.01% to 2.0% based on the weight of carbonyl compound, but for practical purposes, I prefer to use from about 0.1% to 0.5% of zinc nitrate based on the weight of the carbonyl compound. My catalyst may conveniently be prepared by evaporating an aqueous solution of zinc nitrate to dryness on a steam bath and continuing heating of the crystalline residue at 180–200° C. for 8 hours. The zinc nitrate thus obtained is substantially anhydrous and ready for use in my process. The presence of a water-dampened catalyst or an aqueous solution of catalyst should be avoided.

The temperature of my process may likewise be varied according to the type of compound being reacted. Care should be taken to avoid too rapid an elevation of temperature since beta-lactones readily lose carbon dioxide and form unsaturated hydrocarbons. The temperature may be as low as −40° C. or as high as 50° C., but generally a temperature within the range of 0° C. to 30° C. is preferred. Formaldehyde, for example, will react with ketene within the temperature range of 0° to 50° C. while acetone reacts at a temperature of from 5° to 40° C.

Solvents, such as benzene, toluene, heptane, dioxane, ethyl ether, isopropyl ether, carbon tetrachloride, carbon bisulfide and the like, may or may not be used. In order to avoid separation of a solvent after the reaction has been completed, it is preferred to use a solution of the lactone produced from a previous run.

When an aldehyde is the carbonyl compound to be reacted, a more uniform process usually results if the ketene and aldehyde, in gaseous form and in substantially equimolar quantities, are passed into a stirred solution of the zinc nitrate in the lactone, while in other cases the gaseous ketene may be passed into a stirred solution of the zinc nitrate catalyst, carbonyl compound, and lactone. However, it is not necessary always to use a gaseous aldehyde or a liquid ketone, diketone, or keto-ester. The temperature at which the condensation takes place is the critical factor to be considered and it is, therefore, to be understood that my process may be batchwise or continuous, or may be performed in the liquid or vapor phase. When a continuous process is used, any of the conventional apparatus available to the art for such purposes may be employed. The catalyst may be supported on some inert solid carrier therefor, and the flow of reactants may be counter-current or otherwise. I prefer, however, when using a continuous process to carry out my invention in the manner described in the copending application of Hugh J. Hagemeyer and Delmer C. Cooper, Serial No. 660,286, filed April 6, 1946. The pressures may be atmospheric or superatmospheric. If the ketene has been secured by the pyrolysis of acetic acid, it may be advantageous to carry out the process in a scrubber-type reactor. Such a process is described in the copending application of Herbert G. Stone, Serial No. 660,285, filed April 6, 1946.

In some instances the beta-lactone may be distilled directly from the neutralized reaction mixture. However, when the lactone of an olefinic-carbonyl compound has been prepared, ordinarily such a mode of separation cannot be realized even under diminished pressures, since decarboxylization of the formed lactone may follow. Here an extraction or separation by gravity is indicated. When the lactone of a low-boiling carbonyl compound, such as formaldehyde, acetaldehyde, etc. has been formed, the lactone may be separated by flash distillation, i. e., passing the warm reaction mixture into a heated chamber under reduced pressure, the low-boiling components thereof being distilled off, and a residue consisting primarily of the desired lactone remaining. The lactone may then be further purified by flash distillation under reduced pressures, or used without purification as a solvent for a subsequent condensation. This lactone solution need not correspond to the lactone being produced, however for practical purposes it is preferred to use a lactone solution which corresponds to the lactone being formed. When desired, the lactone solvent and formed lactone need not correspond, if the lactone solution may be separated from the formed lactone by fractional distillation, or if the mixture of lactones is intended to be utilized without purification in the preparation of other compounds such as synthetic resins, polymers and the like.

The following examples are given in order to further characterize my invention.

*Example I.—Preparation of beta-propiolactone*

Gaseous ketene is first prepared by pyrolysis of acetone with an electricallcy heated Nichrome coil, and gaseous formaldehyde in monomeric form is prepared by heating a polymeric formaldehyde such as paraformaldehyde to a temperature of 140° to 160° C. The gaseous ketene and gaseous formaldehyde are then mixed in approximately equimolar ratios and are led into a stirred solution of 0.2 g. zinc nitrate in 50 g. beta-propiolactone maintained at a temperature of 0° to 15° C. The passage of the gaseous reactants into the catalyst solution is continued until 1.0 gram mol. of each reactant has been added. The reaction mixture is then stirred with 0.5 g. sodium carbonate in 2 cc. water to neutralize the catalyst. The product is subjected to a high-vacuum flash distillation to remove the catalyst. After redistilling, a 70–80% yield of beta-propiolacetone boiling 37–40°/4 mm. is obtained.

*Example II.—Preparation of beta-butyrolactone*

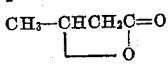

Gaseous ketene obtained as in Example I and gaseous acetaldehyde obtained by heating paraacetaldehyde are mixed in substantially equimolar ratios, and are then led into a stirred solution of 0.3 gm. of zinc nitrate in 60 gms. of beta-butyrolactone maintained at a temperature of −5° C. to 20° C. The passage of gaseous ketene and acetaldehyde are continued until approximately 1.0 gm. mole of each reactant has been added. The reaction mixture is then neutralized by addition of 0.5 gm. of sodium carbonate in 2 cc. of water. The product is then subjected to a high vacuum flash distillation to remove the catalyst, an excellent yield of beta-butyrolactone being attained.

*Example III.—Preparation of beta-methyl beta-butyrolactone*

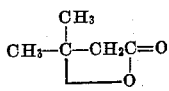

Zinc nitrate (0.5 gm.) is dissolved in 150 cc. of acetone, and gaseous ketene is passed through the solution maintained at a temperature of 5–30° C. The solution is stirred constantly in order to avoid local overheating. After a total of 1.0 gm. mole of gaseous ketene has been passed in, the solution is neutralized by addition of 0.5 gm. of sodium carbonate in 2 cc. water. The product is then subjected to a high-vacuum flash distillation, a good yield of beta-methyl-beta-butyrolactone being attained.

*Example IV.—Preparation of beta-carboethoxymethyl-beta-butyrolactone*

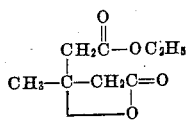

Two hundred grams ethyl acetoacetate, containing 1 g. zinc nitrate are stirred at 20–30° C. and ketene is passed in until approximately 1 mol has been absorbed. The catalyst is neutralized by adding 1 g. sodium carbonate dissolved in 2–3 cc. water. The mixture is distilled at a reduced pressure of 20 mm. Under these conditions, the lactone decomposes to give the ethyl ester of 3-methyl-3 butenoic acid,

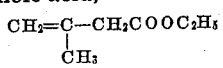

B. Pt. 54–55°/20 mm. $N_D^{20}$ 1.4400. Yield is 25–30%.

*Example V.—Preparation of beta-acetomethyl-beta-butyrolactone*

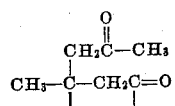

Zinc nitrate (0.5 g.) is dissolved in 150 cc. of acetyl acetone and ketene is passed through the solution maintained at 20–25° C. After 1 mol of ketene has been absorbed, the catalyst is decomposed by adding 1 g. sodium carbonate in 2 cc. water. The mixture is distilled to give two products formed by the loss of carbon dioxide from the mono- and di-lactones present in the reaction mixture. The products are di-isopropenyl methane, B. Pt. 88°/735, and 2-methyl-pentene-1-one-4, B. Pt. 127°/735.

Other carbonyl-containing compounds may replace those illustrated in the above examples. For example, when butyroaldehyde replaces the formaldehyde of Example I or the acetaldehyde of Example II, beta-caproaldehyde having the formula:

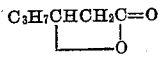

is obtained. Likewise when methyl acetoacetate replaces the ethyl acetate of Example IV, beta-carbomethoxymethyl-beta-butyrolactone having the formula:

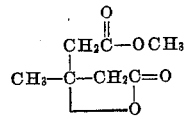

is obtained. When propionyl acetone replaces the acetyl acetone of Example V, beta-propionyl-methyl-beta-butyrolactone having the formula:

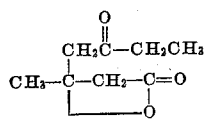

is obtained. Furfuraldehyde when reacted with ketene in the presence of zinc nitrate produces beta-(2-furfuryl)-beta-propionlactone having the formula:

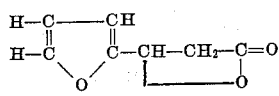

Crotonaldehyde produces the lactone of 2-hydroxy-4-hexenoic acid when reacted with ketene in the presence of zinc nitrate; the formula of this lactone may be represented as follows:

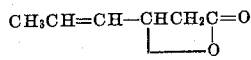

In lieu of separating the lactone from crude reaction mixture, it may be desired to hydrolyze the crude lactone in the presence of an acid catalyst to its corresponding beta-hydroxy carboxylic acid and subsequently dehydrate this acid by heating to an unsaturated carboxylic acid. The reaction may be illustrated as follows:

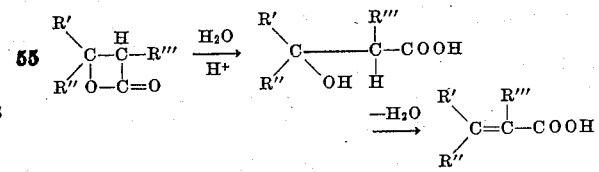

wherein R', R'', and R''' may be hydrogen or hydrocarbon radicals. It may at once be seen from a consideration of the above equation that unsaturated carboxylic acids may only be attained when the carbon atom alpha to the C=O portion of the lactone has a replaceable hydrogen atom or, when R' or R'' is a hydrocarbon radical, the carbon atom adjacent to the carbon atom to which the

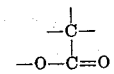

radical is attached must contain a removable hydrogen atom. Of course, there is hydration to a hydroxy carboxylic acid even though these conditions may not be met, though no dehydration to an unsaturated carboxylic acid is realized. Since these unsaturated acids are useful in the preparation of synthetic resins, synthetic rubber, etc., the following examples are given to further characterize this variation of my process.

*Example VI.—Preparation of beta, beta-dimethyl acrylic acid*

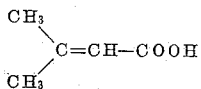

Here the lactone of Example III, present in the crude reaction mixture, is treated with dilute hydrochloric acid to produce the hydroxy carboxylic acid:

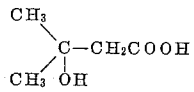

which is then steam-distilled to produce the unsaturated acid, dimethyl acrylic acid.

Zinc nitrate (0.5 g.) is dissolved in 150 cc. of acetone and ketene is passed through the solution at 20–30° C. with efficient stirring. After 1 mol. of ketene has been passed in, the acetone solution is poured into 100 cc. of 15% hydrochloric acid. The mixture is steam distilled. After the acetone and most of the water have been removed, crystals of dimethyl acrylic acid begin to form in the condenser. The product is collected by extracting from the water solution with ether to give a yield of 40–50% based on the ketene consumed. After recrystallizing from water, the dimethyl acrylic acid titrated to an equivalent weight of 99.5. Theoretical equivalent weight=100.0.

*Example VII.—Preparation of beta-ethylcrotonic acid*

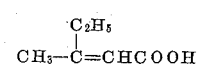

Ketene is passed into a stirred solution of 200 cc. of methyl ethyl ketone and 0.5 gm. of zinc nitrate maintained at 20°–30° C. with efficient stirring. Ketene is continuously passed through the solution until a total of 1.0 gm. mol. has been added. The crude reaction mixture is then poured into 100 cc. of 15% hydrochloric acid and the mixture steam distilled. After excess methyl ethyl ketone and water have been removed, crystals of beta-ethylcrotonic begin to form in the condenser. The product is then attained in 50–60% yield by extracting the water solution with ether, and evaporating off the ether as described in Example VI.

As described above, the lactones attained from my process are useful in preparing unsaturated carboxylic acids. They may also be used to prepare unsaturated esters, amides, or nitriles.

What I claim as my invention and desire to be protected by Letters Patent of the United States is:

1. A process for preparing a beta-lactone which comprises reacting at a temperature of from −40° C. to 50° C. a ketene having the formula:

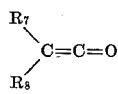

where $R_7$ and $R_8$ each represents a member selected from the group consisting of a hydrogen atom, a methyl group, an ethyl group and a phenyl ($C_6H_5$—) group, with a carbonyl compound selected from the group represented by the four general formulas:

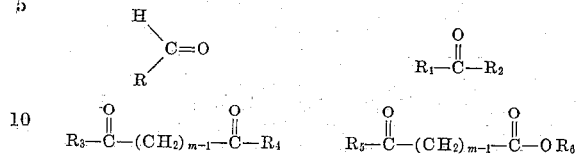

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$, wherein $n$ is a positive integer from 1 to 4, and $m$ represents a positive integer from 1 to 3, in the presence of zinc nitrate.

2. A process for preparing a beta-lactone which comprises reacting at a temperature of from −40° C. to 50° C. a ketene having the formula:

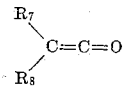

wherein $R_7$ and $R_8$ each represents a member selected from the group consisting of a hydrogen atom, a methyl group, an ethyl group and a phenyl ($C_6H_5$—) group, with a carbonyl compound selected from the group represented by the four general formulas:

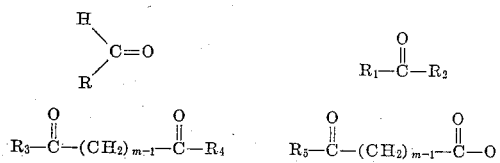

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$ wherein $n$ is a positive integer from 1 to 4, and $m$ represents a positive integer from 1 to 3, in the presence of from 0.01% to 2% by weight, based on the carbonyl compound of zinc nitrate, and in the presence of an inert solvent.

3. A process for preparing a beta-lactone which comprises reacting at a temperature of from −40° C. to 50° C. a ketene having the formula:

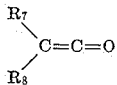

wherein $R_7$ and $R_8$ each represents a member selected from the group consisting of a hydrogen atom, a methyl group, an ethyl group and a phenyl ($C_6H_5$—) group, with a carbonyl compound selected from the group represented by the four general formulas:

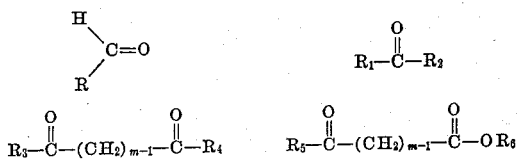

wherein R represents a member selected from the group consisting of a hydrogen atom: an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$ wherein $n$ is a positive integer from 1 to 4, and $m$ represents a positive integer from 1 to 3, in the presence of from 0.01% to 2% by weight, based on the carbonyl compound of zinc nitrate, and in the presence of a beta-lactone which corresponds to the lactone being formed.

4. A process for preparing a beta-lactone which comprises reacting at a temperature of from —40° C. to 50° C. ketene ($CH_2=C=O$) with a carbonyl compound selected from the group represented by the four general formulas:

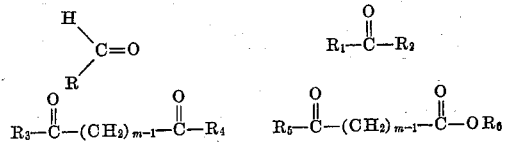

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$, wherein $n$ is a positive integer from 1 to 4, and $m$ represents a positive integer from 1 to 3, in the presence of zinc nitrate.

5. A process for preparing a beta-lactone which comprises reacting at a temperature of from —40° C. to 50° C. ketene ($CH_2=C=O$) with a carbonyl compound selected from the group represented by the four general formulas:

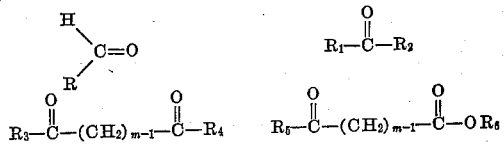

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$ wherein $n$ is a positive integer from 1 to 4, and $m$ represents a positive integer from 1 to 3, in the presence of from 0.01% to 2% by weight, based on the carbonyl compound of zinc nitrate, and in the presence of an inert solvent.

6. A process for preparing a beta-lactone which comprises reacting at a temperature of from —40° C. to 50° C. a ketene having the formula:

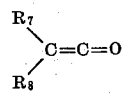

wherein $R_7$ and $R_8$ each represents a member selected from the group consisting of a hydrogen atom, a methyl group, an ethyl group, and a phenyl ($C_6H_5$—) group, with an aldehyde represented by the formula:

wherein R represents an alkyl group of the formula $C_nH_{2n+1}$ where $n$ is a positive integer of 1 to 4, in the presence of from 0.01% to 2% by weight, based on the aldehyde used, of zinc nitrate, and in the presence of an inert solvent.

7. A process for preparing a beta-lactone which comprises reacting at a temperature of from —40° C. to 50° C. a ketene having the formula:

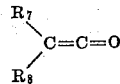

wherein $R_7$ and $R_8$ each represents a member selected from the group consisting of a hydrogen atom, a methyl group, an ethyl group, and a phenyl ($C_6H_5$—) group, with an aldehyde represented by the formula:

wherein R represents an alkyl group of the formula $C_nH_{2n+1}$ where $n$ is a positive integer of 1 to 4, in the presence of from 0.01% to 2% by weight, based on the aldehyde used, of zinc nitrate, and in the presence of a beta-lactone which corresponds to the lactone being formed.

8. A process for preparing a beta-lactone which comprises reacting at a temperature of from —40° C. to 50° C. a ketene having the formula:

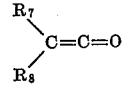

wherein $R_7$ and $R_8$ each represents a member selected from the group consisting of a hydrogen atom, a methyl group, an ethyl group, and a phenyl ($C_6H_5$—) group, with a ketone represented by the formula:

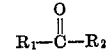

wherein $R_1$ and $R_2$ each represents a member selected from the group consisting of an alkyl group of the formula $C_nH_{2n+1}$ wherein $n$ is a positive integer from 1 to 4, a benzyl group, a beta-phenylethyl group, and a phenyl ($C_6H_5$—) group, in the presence of zinc nitrate.

9. A process for preparing a beta-lactone which comprises reacting at a temperature of from −40° C. to 50° C. ketene (CH$_2$=C=O) with a ketone represented by the formula:

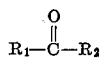

wherein R$_1$ and R$_2$ each represents a member selected from the group consisting of an alkyl group of the formula C$_n$H$_{2n+1}$ wherein $n$ is a positive integer from 1 to 4, a benzyl group, a beta-phenylethyl group, and a phenyl (C$_6$H$_5$—) group, in the presence of from 0.01% to 2% by weight, based on the ketone, of zinc nitrate, and in the presence of an inert solvent.

10. A process for making a beta-lactone which comprises reacting ketene (CH$_2$=C=O) with an aldehyde represented by the formula:

wherein R represents an alkyl group of the formula C$_n$H$_{2n+1}$ where $n$ is a positive integer of 1 to 4, in the presence of from 0.01% to 2% by weight based on the aldehyde used of zinc nitrate, at a temperature of from −40° C. to 50° C. in the presence of an inert solvent.

11. A process for preparing a beta-lactone which comprises reacting, at a temperature of from −40° C. to 50° C., ketene (CH$_2$=C=O) with acetone in the presence of from 0.01% to 2% by weight, based on the acetone used, of zinc nitrate.

12. A process for preparing beta-propiolactone which comprises reacting at a temperature of from −40° C. to +50° C. ketene with formaldehyde in the presence of from 0.01% to 2% by weight based on the formaldehyde used of a catalyst consisting essentially of zinc nitrate.

13. A process for preparing beta-propiolactone which comprises reacting ketene with formaldehyde in the presence of from 0.01% to 2% by weight based on the formaldehyde used of a catalyst consisting essentially of zinc nitrate, at a temperature of from −40° C. to +50° C. in the presence of an inert solvent.

14. A process for preparing beta-propiolactone which comprises reacting ketene with formaldehyde in the presence of from 0.01% to 2% by weight based on the formaldehyde used of a catalyst consisting essentially of zinc nitrate, at a temperature of from −40° C. to +50° C. in the presence of beta-propiolactone as a solvent.

15. A process for preparing beta-propiolactone which comprises forming a gaseous mixture of ketene and monomeric formaldehyde, and passing this gaseous mixture into a solution containing 0.01% to 2% by weight based on the amount of formaldehyde of zinc nitrate catalyst dissolved in beta propiolactone, and continuing the passage of the gaseous mixture of formaldehyde and ketene into the reaction mixture until a substantial portion of the formaldehyde is converted into beta-propiolactone, while maintaining the temperature at from −40° C. to +50° C. during the reaction, thereafter neutralizing the catalyst with an aqueous solution of a weak base, and separating the formed lactone from the crude reaction mixture.

16. A process according to claim 15 wherein the process is conducted in a continuous manner, the beta-propiolactone being separated from the reaction mixture as formed.

17. A process for preparing beta-butyrolactone which comprises reacting at a temperature of from −40° C. to +50° C. ketene with acetaldehyde in the presence of from 0.01% to 2% by weight based on the acetaldehyde of a catalyst consisting essentially of zinc nitrate.

18. A process for preparing beta-butyrolactone which comprises reacting ketene with acetaldehyde in the presence of from 0.01% to 2% by weight based on the acetaldehyde of a catalyst consisting essentially of zinc nitrate, at a temperature of from −40° C. to +50° C. and in the presence of an inert solvent.

19. A process for making beta-butyrolactone which comprises forming a gaseous mixture of ketene and monomeric acetaldehyde in substantially equimolar ratios, and passing this mixture into a stirred solution containing from 0.01% to 2% by weight based on the amount of acetaldehyde used of zinc nitrate catalyst, continuing passage of this mixture until substantially all the acetaldehyde has been converted into beta-butyrolactone, while maintaining the temperature at from −40° C. to +50° C., thereafter neutralizing the catalyst with an aqueous solution of a weak alkali, and separating the beta-butyrolactone from the crude reaction mixture.

JOHN R. CALDWELL.

No references cited.